Dec. 17, 1968  G. B. GREENE  3,416,487
METHOD AND APPARATUS FOR GENERATING AND APPLYING SONIC ENERGY
Filed March 22, 1966  4 Sheets-Sheet 1
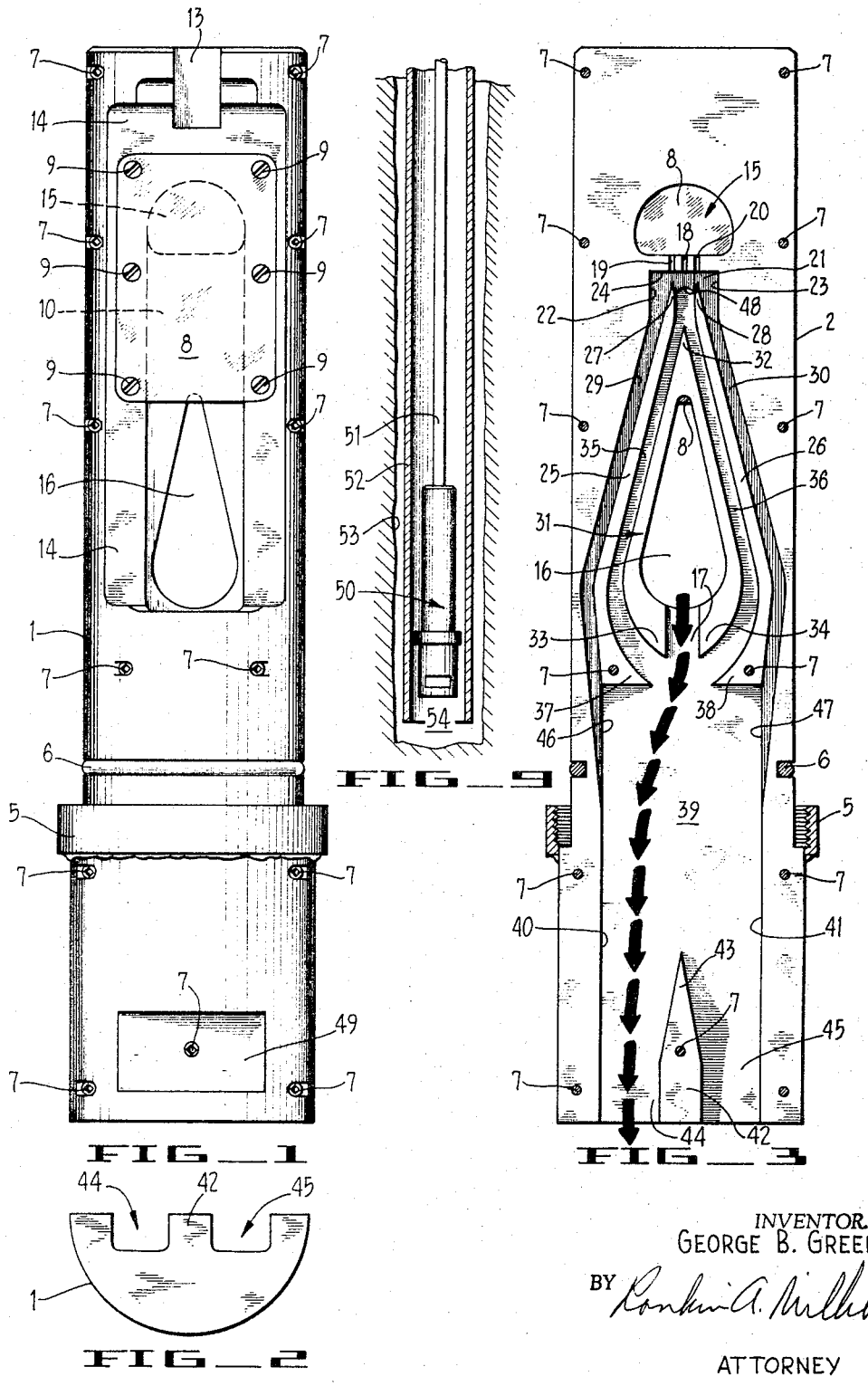
INVENTOR.
GEORGE B. GREENE
BY
ATTORNEY

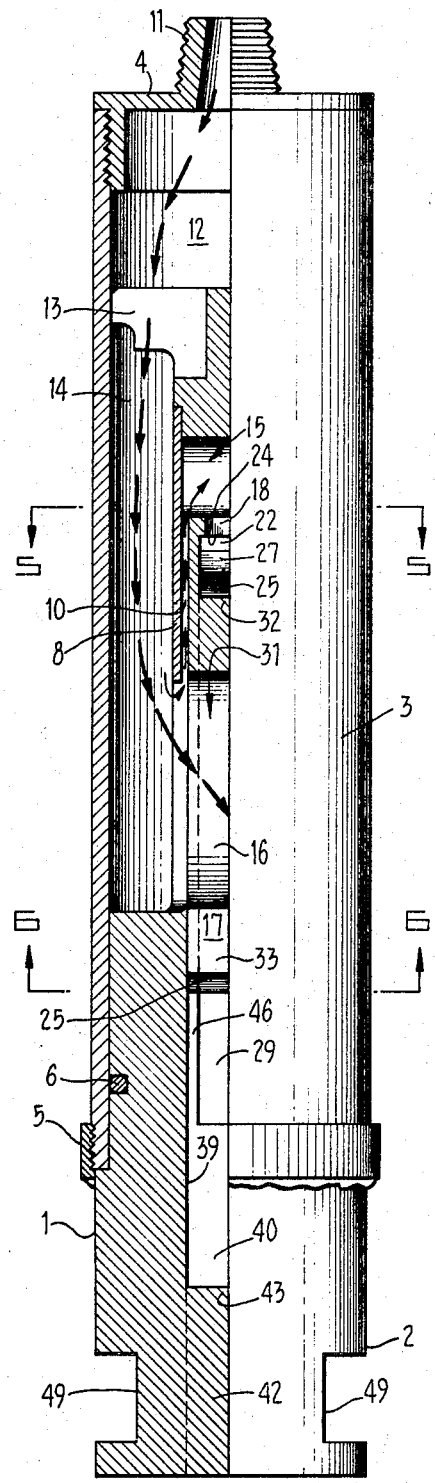
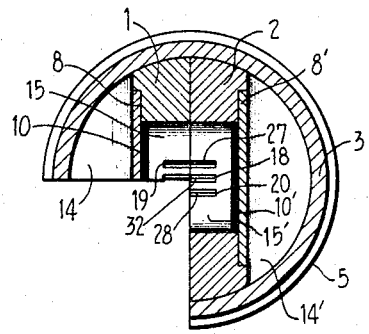
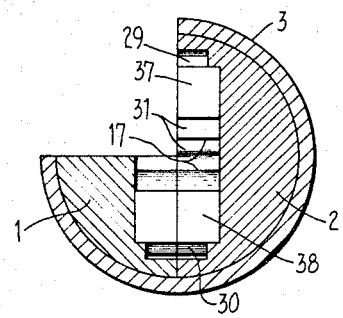
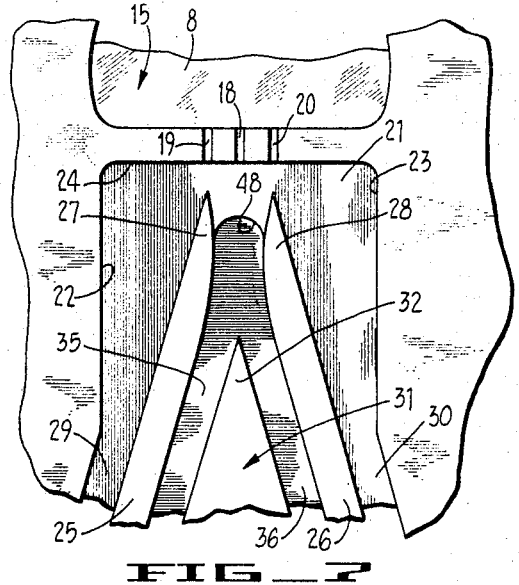

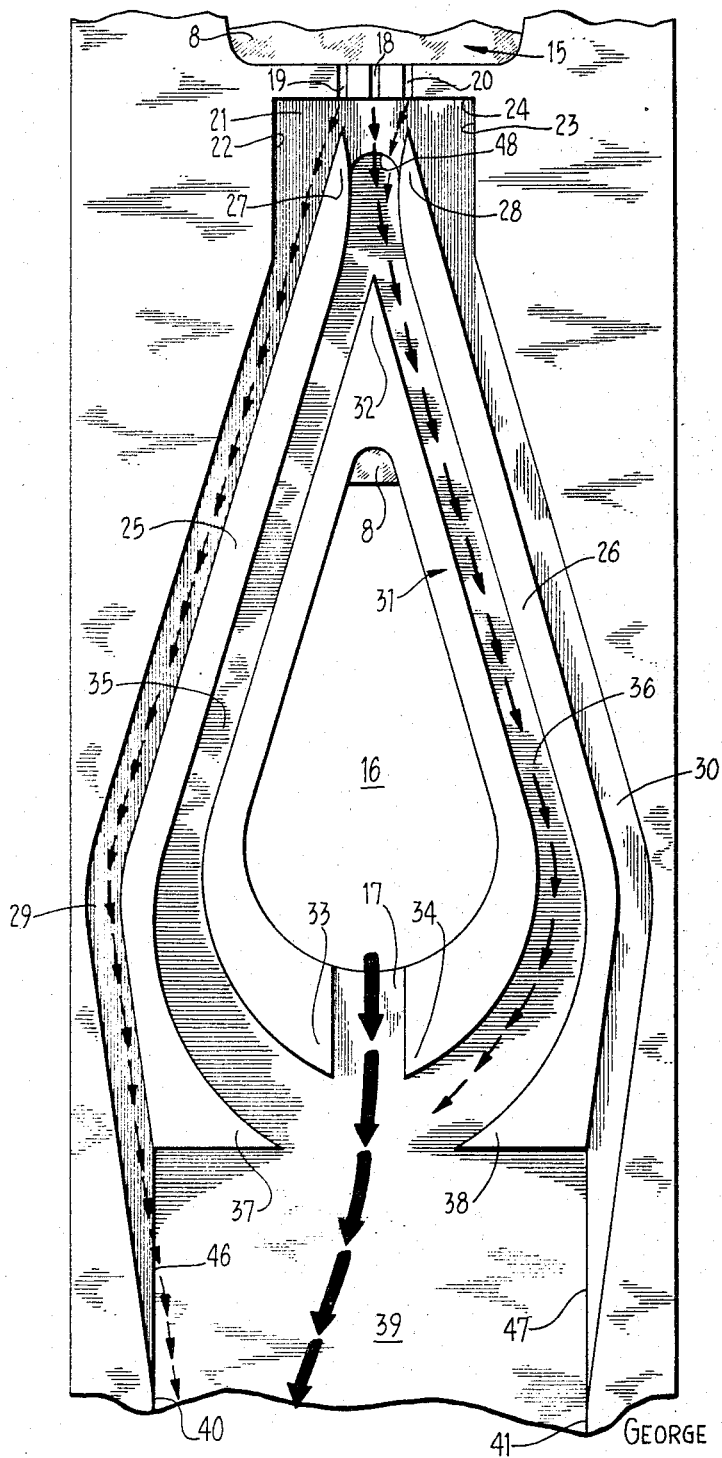
FIG_8

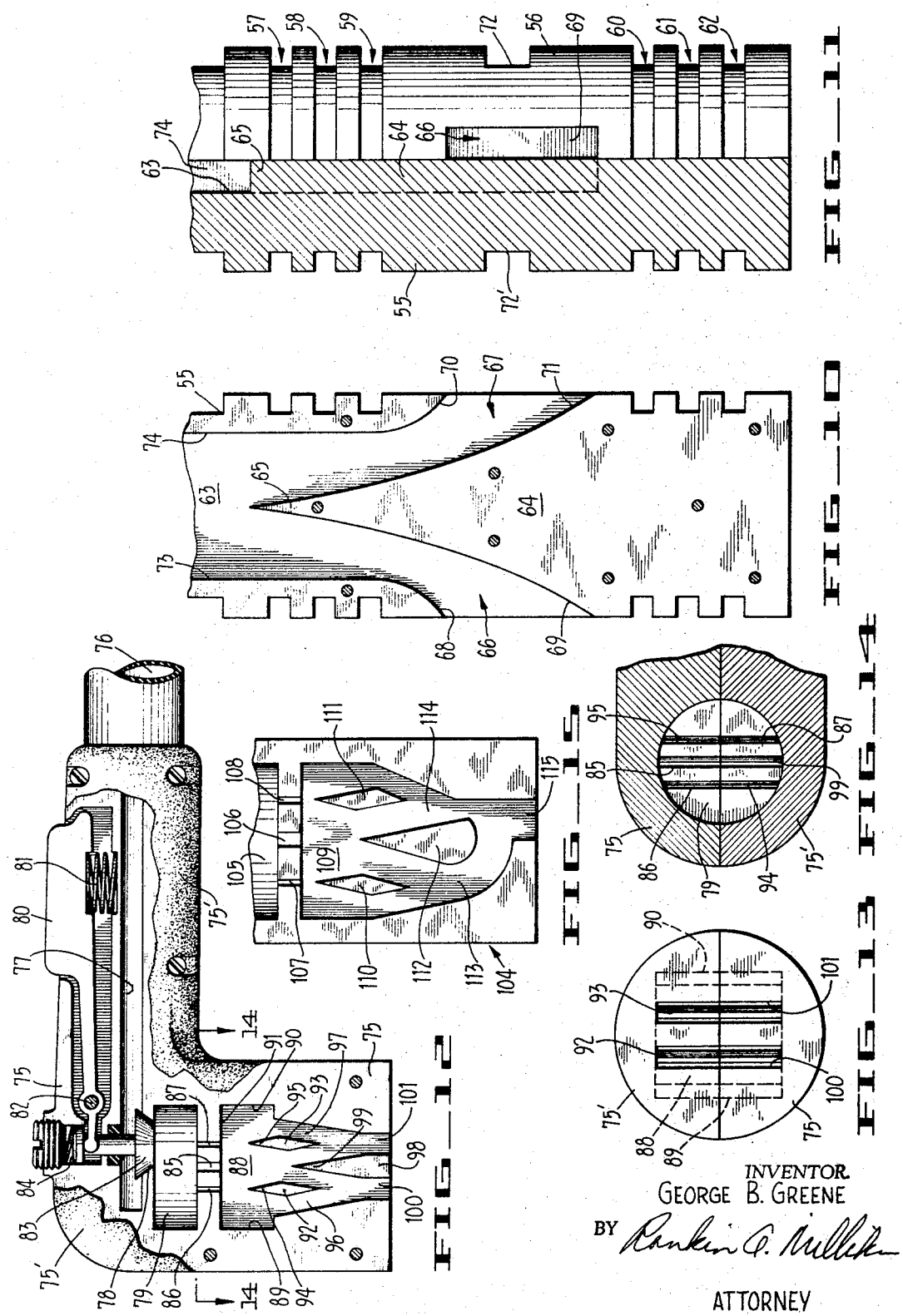

United States Patent Office 3,416,487
Patented Dec. 17, 1968

3,416,487
METHOD AND APPARATUS FOR GENERATING AND APPLYING SONIC ENERGY
George B. Greene, Lafayette, Calif., assignor to Green Engineering Company, a corporation
Filed Mar. 22, 1966, Ser. No. 536,363
11 Claims. (Cl. 116—137)

This invention relates to methods and apparatuses for generating and applying sonic energy.

Methods and apparatuses capable of generating sonic energy, or generating and applying sonic energy are of considerable use in numerous applications, including, for example, earth disintegration and removal, as in mining, well drilling, and the like, cleaning, chemical processing, and many others.

While many, if not all, of the above listed applications of sonic energy generating, or generating and applying, means have been undertaken in the prior art, these undertakings have been severely handicapped by the limitations of the prior art sonic energy generating devices. For example, the electrical (e.g., piezoelectric, magnetostrictive) sonic energy generating devices which are among the highest powered of prior art sonic devices are characterized by the fact that their electrical and other losses are manifested as heat, thereby severely limiting the power capacity of these devices due to temperature rise. Also, many of the higher powered sonic energy generating, or generating and applying, means of the prior art, particularly the electrical types, are characterized in that certain of their parts are subject to greater disintegrative forces than these devices can apply to energy receiving media.

It is therefore an object of the present invention to provide methods and apparatuses for generating sonic energy which fulfill the demands of both long recognized and new applications requiring a wide range of powers, including very high powers.

It is another object of the present invention to provide such apparatuses with sonic energy applying means which couple the energy generated by said apparatuses into receiving media with optimum efficiency.

It is a further object of the present invention to provide novel apparatuses for generating, or generating and applying, sonic energy which are powered by a fluid and operate into a fluid, said fluids being either the same or different fluids.

It is another object of this invention to provide sonic energy generating apparatuses which are characterized by either operating temperature drop, rather than rise, or extremely low operating temperature rise.

It is another object of the present invention to provide high powered sonic energy generating, or generating and applying, apparatuses capable of imparting greater disintegrative forces to energy receiving media than are induced in any of the parts of the apparatuses themselves.

Other objects of the invention will in part be obvious, and will in part appear hereinafter.

The invention, accordingly, comprises the several steps, the relation of one or more of such steps to each of the others, and the apparatus embodying features of construction, combinations of the elements, and arrangements of parts which are adapted to effect such steps, all as exemplied in the following detailed disclosure, and the scope of the present invention will be indicated in the appended claims.

For a fuller understanding of the nature and objects of the invention, reference should be had to the following detailed description, taken in connection with the accompanying drawings, in which:

FIGURE 1 is an elevational view of a first component of a first embodiment of the present invention;

FIGURE 2 is a bottom view of a second component of said first embodiment of the present invention;

FIGURE 3 is an elevational view of the component of said first embodiment of the present invention shown in FIGURE 2;

FIGURE 4 is an elevational view, partially in section, of said first embodiment of the present invention;

FIGURES 5 and 6 are sectional views of said first embodiment of the present invention taken on lines 5—5 and 6—6, respectively, of FIGURE 4;

FIGURE 7 is a fragmentary view of a modification of said second component of said first embodiment of the present invention;

FIGURE 8 is a fragmentary view of the component of said first embodiment of the present invention shown in FIGURE 3;

FIGURE 9 illustrates an application of said first embodiment of the present invention;

FIGURE 10 is a fragmentary view of a component of a second embodiment of the present invention;

FIGURE 11 is an elevational view, partially in section, of said second embodiment of the present invention;

FIGURE 12 is an elevational view, partially in section, of a third embodiment of the present invention;

FIGURE 13 is a fragmentary bottom view of said third embodiment of said present invention;

FIGURE 14 is a sectional view of said third embodiment of the present invention taken on line 14—14 of FIGURE 12;

FIGURE 15 is a fragmentary view of a component of a modification of said third embodiment of the present invention.

Referring now to FIGURES 1 through 6 the construction of said first embodiment of the present invention will be described in detail.

For convenience in construction and operation said first embodiment is fabricated as three major components, viz., a pair of components 1 and 2, called "semi-bodies," and a component 3, called a "sleeve." These three components are dismountably assembled as described hereinbelow.

Semi-body 1 (FIGURE 1) and semi-body 2 (FIGURES 2 and 3) are generally semi-cylindrical in shape and may be thought of as mirror images of each other. When affixed to each other with their planar faces in contact said semi-bodies form a generally cylindrical body having a plurality of chambers and passages therewithin the configuration of which can be determined by inspection of the planar side of either semi-body, e.g., (FIGURE 3).

Said generally cylindrical body formed by affixing the semi-bodies to each other, hereinafter called the "main body," is then encased in sleeve 3, as best shown in FIGURE 4. Sleeve 3 is provided at one end with a sleeve head 4, and is provided with external threads at its other end, said external threads maintaining sleeve 3 is placed over the main body when engaged by the internal threads in a fastening ring 5, one-half of fastening ring 5 constituting part of semi-body 1, and the other half of fastening ring 5 constituting part of semi-body 2. An O-ring 6 is provided in a suitable slot extending around said body in order to form a substantially pressure-tight seal between the main body and sleeve 3.

Semi-bodies 1 and 2 may be affixed to each other by any suitable means, a plurality of socket head bolts 7 and cooperating nuts being employed in said first embodiment.

While the main body is shown and described herein as dismountably assembled from semi-bodies 1 and 2, it is to be understood that this mode of construction is adopted merely as a matter of convenience in fabrication and operation, being particularly convenient in experimentation to determine suitable configurations for the passages and chambers within the main body. The main body might as well, in high production models, for instance, be fabricated in one piece, e.g., by "lost wax" casting methods, or the like. On the other hand, the complete passages and chambers within the main body, however fabricated, constitute principal features of the present invention. For this reason, the same numerals used to refer to the complete passages and chambers within the main body, their walls, and the partitions between them, will also be used to refer to the corresponding half-passages, half-chambers, half-walls, and half-partitions in the semi-bodies.

In addition to said three major components, said first embodiment also comprises a pair of plates 8, hereinafter called "directors," or "flow directors". Each of said semi-bodies 1, 2 has a flow director 8 affixed to it, for instance by means of a plurality of screws 9 as shown in FIGURE 1. The function of flow directors 8 will be described in detail hereinafter, as will the function of the cavities and passages in the main body, etc., it sufficing for the moment to point out that flow directors 8 cooperate with corresponding recesses in their associated semi-bodies to define a pair of passages 10.

As may be understood from FIGURE 4, a threaded compressed air input nipple 11 communicates with passages 10 by way of a head chamber 12, a pair of notches 13, and a pair of side passages 14.

As may also be understood from FIGURE 4, passages 10, also called "oscillator supply passages," provide communication for compressed air between side passages 14 and an oscillator supply chamber 15. That is to say, compressed air admitted to the device of this embodiment at nipple 11 is supplied to oscillator supply chamber 15 by way of head chamber 12, the two notches 13, the two side passages 14, and the two oscillator supply passages 10.

As shown in FIGURE 5, there is but one chamber 15, this chamber being formed by corresponding mirror image cavities, or half-chambers, in semi-bodies 1 and 2 when said semi-bodies are united by means of bolts 7 as hereinabove described. For reasons given above, the two half-chambers making up oscillator supply chambers 15 will also be referred to by the numeral 15.

As indicated hereinafter, other chambers and certain passages within said main body are formed by the mating of corresponding cavities, half-chambers, or half-passages in semi-bodies 1 and 2 when semi-bodies 1 and 2 are joined by means of bolts 7.

Such a chamber formed from mating cavities, or half-chambers, in said semi-bodies is a chamber 16 called the amplifier supply chamber.

As may best be seen in FIGURE 4, the amplifier supply chamber 16 is supplied with compressed air from nipple 11 by way of head chamber 12, notches 13, and side passages 14. The function of amplifier supply chamber 16 will be described hereinbelow.

As may be seen in FIGURE 3, a passage 17 communicates downward from chamber 16 to another chamber, described hereinafter, this passage being defined by mating channels, or half-passages, in semi-bodies 1 and 2, and said another chamber also being defined by mating cavities in semi-bodies 1 and 2. Passage 17 is also called the "power orifice," for reasons which will become apparent.

Referring again to FIGURE 3, the upper portion thereof, it will be seen that three passages 18, 19, and 20 communicate from oscillator supply chamber 15 to a chamber 21 which is also formed by mating cavities in semi-bodies 1 and 2. For reasons which will become apparent hereinafter, passages 18, 19, and 20 are called "nozzles," and said chamber is sometimes called a "resonating chamber," or "resonator." For convenience, the walls 22 and 23 of chamber 21 which are in part formed from semi-body 1 and in part formed from semi-body 2 may hereinafter be called "side walls," while the wall of chamber 21 totally formed from semi-body 1 may be designated the "front wall" of chamber 21, and the wall of chamber 21 formed entirely from semi-body 2 may be designated the "back wall" of chamber 21. Wall 24 is called the "top wall" of chamber 21. For reasons given above, the half-walls making up side wall 22 are also referred to by the numeral 22, etc.

While the particular functions of nozzles 18, 19, and 20 will be specified in detail hereinafter, it should be noted at this point that these nozzles are supplied with compressed air from air inlet nipple 11 by way of head chamber 12, notches 13, side passages 14, oscillator supply passages 10, and oscillator supply chamber 15.

Going now to FIGURE 3, by way of example, it may be seen that a pair of half-partitions 25 and 26 are provided as part of semi-body 2, said half-partitions 25 and 26 extending toward the observer in FIGURE 3 to such an extent that their top ends (ends toward the observer) lie in the planar face of semi-body 2. Since, as noted hereinabove, semi-body 1 is substantially a mirror image of semi-body 2, it will be apparent that a mating pair of half-partitions also designated 25 and 26 will be found in semi-body 1. When semi-bodies 1 and 2 are joined by means of bolts 7, the top end of half-partition 25 in semi-body 1 will be brought into contact with the top end of half-partition 25 in semi-body 2, thereby forming a complete partition 25, and the top end of half-partition 26 in semi-body 1 will be brought into contact with the top end of half-partition 26 in semi-body 2, thereby forming a complete partition 26.

Going now to FIGURE 3, it may be seen that partition 25 terminates at its upper end in a splitter 27. As will be apparent from the drawings and this specification, splitter 27 extends from the front wall to the back wall of cavity 21, as the terms "front wall" and "back wall" are above defined, being formed in part from semi-body 1 and in part from semi-body 2. Similarly, partition 26 terminates in chamber 21 in a splitter 28.

Referring to FIGURE 3, it may be seen that a pair of passages 29, 30 communicating between chamber 21 and a larger chamber (described below) are provided, the inside walls of passages 29 and 30, i.e., the walls nearest the axis of the main body, being defined by partitions 25 and 26, respectively. For reasons which will become apparent hereinafter, passages 29 and 30 are called "spoiler passages," or "anticoanda passages."

As may also be seen in FIGURE 3, amplifier supply chamber 16 is defined by a partition 31, which is continuous except where interrupted by power orifice 17. Partition 31 is equipped at its end nearest chamber 21 and remote from power orifice 17 with a splitter 32.

It should be noted at this point that a characteristic feature of this first embodiment lies in the fact that, as explained further below, splitters 27, 28, and 32 are rigidly mounted in the sense that they are integral with semi-bodies 1 and 2 all the way out to their knife-edge like extremities, or leading edges. The invention, however, is not limited to the use of rigidly mounted splitters, or spiltters having knife-like edges.

Partition 31 also terminates in a pair of splitters 33, 34 at the outer end of power orifice 17.

Further reference to FIGURE 3 will show that an additional pair of passages 35, 36 is defined by partition 31 and partitions 25 and 26, respectively. For reasons which will become apparent hereinafter, passages 35 and 36 may hereinafter be called "control passages."

At the ends of passages 35 and 36 adjacent power orifice 17 partitions 25 and 26 terminate in splitters 37 and 38, respectively.

It is noted that all the ends of partitions tapering to sharp or narrow edges are called splitters, though, as will become apparent hereinbelow, not all of these splitters are equally critical to the operation of the device of this embodiment, or function in the same way.

Going now to the lower portion of FIGURE 3, it will be seen that a chamber 39, called the throat chamber, extends from power orifice 17 to a pair of ports, sometimes called "radiators," which are in direct communication with the space outside the device of the embodiment. A pair of side walls 40 and 41 which define the width of throat chamber 39 can each be seen to be formed from a pair of partitions, one partition of each pair comprising part of semi-body 1 and the other comprising part of semi-body 2. Located approximately equidistant from side walls 40 and 41 in the end of throat chamber 39 remote from partitions 25, 26, and 31, etc., is a short partition 42, called herein a "divider." Divider 42 (as may be seen in FIGURE 2) divides the outer end of throat chamber 39 into a pair of ports, or radiators, 44 and 45. Further, partition 42 is equipped at its end remote from said ports with a splitter 43, which is rigidly mounted in the sense in which the expression is applied above to splitters 27, 28, and 32.

As noted hereinabove, passages 29 and 30 communicate from chamber 21 to chamber 39, penetrating side walls 40 and 41 of chamber 39 at locations immediately adjacent the ends of partitions 25 and 26.

Referring again to FIGURE 3, and comparing the same with FIGURE 4, it may be seen that the back walls of passages 29 and 30 and the back wall of chamber 21 are all located closer to the plane face of semi-body 2 than are the back walls of passages 35 and 36, power orifice 17, and throat chamber 39. A pair of risers 46 and 47 extending between these two back wall levels may be seen at the ends of passages 29 and 30 adjacent throat chamber 39 and a third riser 48 extending between these two back wall levels may be found at the junction between chamber 21 and passages 35 and 36. Similar risers, also designated 46, 47, and 48, are found between two front wall levels in semi-body 1. That these risers exist in both semi-bodies 1 and 2 may be clearly seen in FIGURE 6 by comparing, say, the indicated front-to-back dimension of passage 30 with the indicated front-to-back dimension of splitter 38.

A pair of wrench flats 49 are provided at the lower end of the device of the first embodiment whereby the device may be gripped while the threads of nipple 11 are being interengaged with corresponding internal threads in a compressed air supply member.

While particular fastening means have been illustrated herein for interconnecting the various parts of this embodiment of the invention and for connecting this embodiment of the invention to compressed air supply means, e.g., bolts 7, interiorly threaded ring 5, threaded nipple 11, etc., additional fastening means, other fastening means, or both, may be employed.

Due to the inadequacy of existing experimental techniques for the measurement of the power levels of high power sonic travelling and standing waves, and the recording of the wave forms of such high power sonic waves, among other experimental difficulties, the mode of operation of the modification of the first embodiment of the instant invention shown in FIGURES 1 through 6 and 8 has had limited empirical confirmation. A theoretical explanation of the mode of operation of said first embodiment has, however, been evolved, and will be set out hereinbelow. It is to be understood, however, that the invention is in no way limited by this theory of operation, the theory being purely provisional and subject to change as more empirical data bearing upon the operation of the invention are evolved. That is to say, the invention is defined in the appended claims, and is in no way limited by the theory of operation now to be described, nor by any modification of such theory necessitated by subsequently acquired empirical knowledge of the operation of the invention.

Before setting out a theory of operation, it is noted that certain parameters however, of said first embodiment are known from comparison of experimental results to be modifiable to a considerable extent without causing this embodiment to become inopeartive, or to function at low power levels. Thus, while certain structural parameters of the first embodiment may be optimized to bring about maximum power output, desirable output wave pattern, or other desirable operating characteristics, or combinations thereof, the invention is in no sense limited to optimum combinations of structural parameters, since modifications of said first embodiment producing less than maximum output power, or having other less than optimum operating characteristics, or combinations therof, have useful applications, some of such modifications producing results not achieveable by devices of the prior art.

One such modification of the first embodiment illustrated herein (FIGURES 1 through 6 and 8) is shown in FIGURE 7. The modification of FIGURE 7 differs from the first embodiment in that the walls 22, 23 of chamber 21 in the first embodiment are spaced from nozzles 19 and 20, respectively, by one-half wavelength of sound in the operating fluid, e.g., air, at a given oscillator design frequency, while the distance of walls 22 and 23 from the adjacent nozzles 19 and 20 in the modification of FIGURE 7 is made unequal to any multiple of one-half wavelength of sound in the operating fluid at said oscillator design frequency. In fact, the wall-to-outside nozzle distance in an actual embodiment of the modification of FIGURE 7 using air as its operating fluid was made approximately equal to a quarter wavelength of sound in air at a selected oscillator design frequency, and damping material was applied to walls 22 and 23 to eliminate reflections therefrom and secure an indication of whether the employment of a chamber 21 having resonant properties at said oscillator design frequency is necessary to the operation of the device of the invention.

It was thus discovered that the modification shown in FIGURE 7 produced quantities of ultrasonic power not available in known prior art devices despite its non-resonant construction. For this reason, i.e., that even the non-optimum modification of FIGURE 7 is superior in the power producing respect to the devices of the prior art, it is again emphasized that the invention is not limited to theoretically optimized structures shown and described herein, but is limited only by the breadth of the appended claims.

Theory of operation

The theory of operation of the device of said first embodiment of the present invention, as presently understood, will now be explained in connection with FIGURE 8.

While, as a matter of convenience, this theory of operation will be explained using air as the operating fluid, the invention is not restricted to the use of any particular operating fluid. To the contrary, it is contemplated that the invention may be employed to generate sonic energy in any gas, liquid, or other fluid medium, or any combination thereof, including air, water, petroleum, or compound fluid material such as drilling mud. It is also contemplated that the invention may be employed to generate sonic energy in an operating fluid other than the fluid in which the object to be treated with said sonic energy is immersed.

Further, it is assumed that the operating fluid, in the first embodiment, air, is supplied under pressure to oscillator supply chamber 15 and amplifier supply chamber 16 by way of nipple 11, head chamber 12, notches 13, side pasages 14, and oscillator supply passages 10 (FIGURE 4). By way of example, a device substantially like said first embodiment has been operated using as its operating fluid air at a supply pressure of the order of 600 pounds per square inch gauge.

Going now to FIGURE 8, it is first noted that FIGURE 8 shows what, for purposes of this theory of operation, may be designated the oscillator region and the amplifier region of the device of said first embodiment.

The oscillator region may be thought of as extending upward, i.e., toward head chamber 12, from a plane perpendicular to FIGURE 8 and intersecting with the inner surfaces of partitions 25 and 26 at their point of closest proximity, i.e., the roots of splitters 27 and 28. This plane also cuts semi-body 1, though only semi-body 2 is shown in FIGURE 8. This plane, hereinafter called the "oscillator-amplifier dividing plane" is, of course, a mere conceptual device for convenience in explanation, and, thus, is not shown in the drawings, to avoid confusion with actual cuts, divisions between parts, etc.

The oscillator region of said first embodiment of the invention, then, is that portion of the first embodiment extending upward from the oscillator-amplifier dividing plane to the top of the first embodiment. Thus, the oscillator region includes nozzle channels 18, 19, and 20 extending between oscillator supply chamber 15 and oscillator chamber cavity 21, defined by walls 22, 23, and 24, etc. Further, the oscillator region also includes splitters 27 and 28 at the upper ends of walls 25 and 26, and the common upper end of channels 35 and 36 located therebetween. Yet further, the oscillator region includes chambers 15 and 16, head chamber 12, notches 13 and 13' and parts of passages 10 and 10', and 14 and 14'. The passages 10', 13', and 14', will be located in semi-body 2, as may be seen in FIGURE 5.

Having described the oscillator region of a complete example of said first embodiment of the present invention, attention is now directed to the amplifier region of said first embodiment. The amplifier region of said first embodiment is defined for the purpose of explaining the present theory of operation as that region of the device extending from the oscillator-amplifier dividing plane downward in FIGURE 8 to a second plane parallel to the oscillator-amplifier dividing plane which intersects the device approximately at the lower end of FIGURE 8. Put differently, said second plane, hereinafter called the "amplifier-throat dividing plane", passes through said first embodiment at or near the intersections between the outside walls of passages 29 and 30 and walls 40 and 41 of throat chamber 39. (In the remaining discussion of the parts of the amplifier region, as in the previous sentence, complete chambers, partitions, and passages will be referred to, rather than the corresponding half-parts, i.e., half-chambers, half-partitions and half-pasages, of the corresponding semi-bodies.)

The amplifier region of said first embodiment of the present invention, then, includes amplifier supply chamber 16, power orifice 17, passages 29, 30, 35, and 36, and the inner end of throat chamber 39 (FIGURE 8) and parts of passages 10 and 10' and 14 and 14'.

Further, for convenience in explaining the theory of operation, that part of said first embodiment extending from the oscillator-throat dividing plane in a direction away from the amplifier region will hereinafter be called the "throat region." As seen in FIGURE 3, the throat region of said first embodiment will be that portion thereof extending approximately from the plane of the upper end of fastening ring 5 downward, i.e., to the lower end of walls 40 and 41 and divider 42.

As may be seen by consideration of FIGURE 4, the two dividing planes described hereinabove divide the device of said first embodiment into three general regions, two of which, broadly speaking, include certain supply passages or parts thereof, e.g., side passages 14, 14', oscillator supply passages 10, 10'. Also, broadly speaking, the throat region includes insets 49 which are actually wrench flats. The theory of operation, however, does not concern itself with these supply passages, etc. Therefore, the term "section" is used to mark the distinction between those portions of each region made up of passages and chambers common to the semi-bodies which serve to generate and apply the sonic energy and the supply passages, wrench flats, and the like. For example, the active area of the oscillator region including parts common to the two semi-bodies, such as chamber 15, nozzles 18, 19, and 20, oscillator chamber 21, and splitters 27 and 28, is called the "oscillator section."

Similarly, the active area of the amplifier region including parts common to the semi-bodies, such as amplifier supply chamber 16, power orifice 17, passages 29, 30, 35, and 36, and the upper end of throat chamber 39, is called the "amplifier section."

Also, the active area of the throat region including parts common to the semi-bodies, such as the lower portion of throat chamber 39 and ports 44 and 45 divided by divider 42, is called the "throat section."

These sections are named as they are to emphasize the functions which they are believed to fulfill in the overall operation of said first embodiment according to the present theory of operation.

Thus, the oscillator section is believed to act as the source of relatively low energy sonic pulsations which are utilized by the amplifier section to produce deflections of the power jet 17' which issues from power orifice 17, these deflections later being converted to high power sonic pulsations by divider 42, i.e., by ports 44 and 45. It will be appreciated that no statements herein should be construed as an assertion that, for example, there are no sonic standing waves of any kind within the oscillator, amplifier, or throat sections, that there are no sonic travelling waves produced in the region outside the throat end of the device, that the design frequency of the oscillator section is the same as the frequencies of the sonic waves produced in the throat chamber, or in the region outside the throat end of the device, or that the sonic waves found anywhere within or without the device are of single, or highly stable, frequency.

*Theory of operation—Oscillator section*

Turning attention now to the oscillator section, as defined hereinabove, it may be seen that each of two outer nozzles 19 and 20 has associated with it a corresponding splitter, 27 and 28, respectively. That is, nozzle 19 and splitter 27 constitute together a first nozzle-splitter pair, while nozzle 20 and splitter 28 constitute together a second nozzle-splitter pair.

Each of these nozzle-splitter pairs may be seen, however, to constitute what is known in the prior art as a jet-edge transducer, jet-edge whistle, or jet-edge generator. Such jet-edge transducers have long been known in the prior art, their theory of operation having been extensively analyzed and explained in the literature in connection with organ pipes, steamboat whistles, and the like, e.g., in the works of Helmholtz. In fact, jet-edge transducers consisting of a short tubing terminating in a nozzle of rectangular cross-section coaxial with the bore of the tubing and provided with means such as parallel arms whereby a splitter is mounted on the axis of the tubing opposite the nozzle and in alignment therewith are regularly sold as complete assemblies for use as ultrasonic energy sources. Some of these commercially available jet-edge transducers are provided with means for adjusting the distance between the splitter and the nozzle. Thus, it may be seen that the combination consisting of a single nozzle and associated splitter, taken by itself and without reference to any other such combination, constitutes a device well-known in the prior art, the operation of which is the subject of a well-established body of theory which need not be elaborated here. It suffices for present purposes to point out that the properties of a rectangular nozzle which directs a sheet-like jet of air onto a splitter aligned with and pointing toward the nozzles are well established. The principal one of said properties is that in such combinations the sheet-like jet issuing from the nozzle oscillates back and forth across the upstream, or leading edge of the splitter, i.e., from side to side thereof, thereby producing sonic waves in the medium in which the combination is immersed. It is also well-known that the leading edge of the splitter in these combinations may be either "free" or "fixed," i.e., the leading edge of the splitter may either be separate from its supporting means or affixed to, or integral with, its supporting means. Many of the commercially available jet-edge transducers, or whistles, employ the free leading edge type of splitter while splitters 27 and 28 herein are exemplary of the fixed leading edge type (see splitter 27 in FIGURE 4). From the preceding discussion it will be understood that the oscillator section includes two jet-edge transducers, viz., nozzle 19 in combination with splitter 27 and nozzle 20 in combination with splitter 28, neither of these jet-edge transducers, taken alone, constituting inventive subject matter in itself.

The combination of nozzle 19 and splitter 27 will hereinafter be referred to as the "first transducer," while the combination of nozzle 20 and splitter 28 will hereinafter be referred to as the "second transducer."

While neither of these transducers taken by itself constitutes inventive subject matter, the relationship of these transducers to each other, and the relationship of the other elements of the oscillator section to these transducers, constitute characteristic features of the present invention. Some of the principal ones of these relationships as embodied in said first embodiment may be seen in FIGURE 8.

As seen in the drawings, the planes of symmetry of the first and second transducers are substantially parallel and the transducers are both located in oscillator chamber 21. In a specimen of said first embodiment which has been constructed and found to operate satisfactorily, the first and second transducers are spaced apart by a distance equal to one-half the calculated wavelength in the operating medium, air, corresponding to the design frequency of the oscillator. In this specimen the design frequency was chosen as approximately 20 kilocycles per second, the wavelength in air corresponding thereto, or design wavelength, being 0.6 inch. Thus, the first and second transducer of this specimen of said first embodiment were spaced apart by 0.3 inch center-to-center. The other dimensions of the oscillator section of this specimen believed to be significant to the production of strong oscillations were related to the 0.6 inch design wavelength as follows.

While, as noted in the previous paragraph, a specimen of the invention has been made in which the planes of symmetry of the transducers are spaced by one-half the calculated wavelength in the operating medium corresponding to the design frequency of the generator, or oscillator, a more optimum spacing may be derived from the formula $$B = \sqrt{\frac{\lambda^2}{4} + a\lambda}$$

where $a$ is an experimentally determined constant.

Driven jet nozzle 18, the function and operation of which will be described hereinbelow, was located halfway between said first and second transducers; that is to say, driven jet nozzle 18 was located between, and one-quarter of one design wavelength, 0.15 inch in this case, from each of the jet-edge transducers.

Outer walls 22 and 23 of oscillator chamber 21 were spaced from their adjacent transducers by one-half of one design wavelength, i.e., 0.3 inch in the specimen of said first embodiment now being described. That is, wall 22 was spaced 0.3 inch from transducer 19, 27, while wall 23 was spaced 0.3 inch from transducer 20, 28. It is believed that this spacing between each transducer and its adjacent parallel wall is significant parameter of the oscillator section. Comparison of the performance of this specimen of the invention with another specimen of the invention (the modification of FIGURE 7) in which the outer walls were not spaced from the transducers by one-half design wavelength indicated that the specimen having one-half design wavelength spacing was superior in efficiency. For this reason, a distinction will hereinafter be made between "tuned chamber" specimens of the invention, i.e., those having their outer walls 22, 23 spaced one-half design wavelength from their adjacent transducers, as in FIGURE 8, and "untuned chamber" specimens in which this one-half design wavelength spacing relationship is not preserved, as in FIGURE 7.

These dimensions of certain specimens of the invention are given as exemplary only, and are in no sense limitative of the invention.

Having described the construction and dimensions of certain specimens of the invention a theory of operation will now be explained.

First, as noted hereinabove, a jet-edge transducer pair, when its nozzle is supplied with compressed air, will oscillate, i.e., the sheet-like jet issuing from the nozzle will continuously and rapidly cross the leading edge of the splitter in the fashion of a pendulum, the jet being directed first to one side of the leading edge and then to the other side of the leading edge, alternately.

It is characteristic of such a single jet-edge transducer working alone, e.g., without an associated resonator pipe, or the like, that its output frequency is unstable, being considerably affected by such factors as the supply pressure and the configuration of physical structures closely adjacent the transducer.

In the adjacent, parallel transducer pairs of the present invention, however, the fundamental frequency of oscillation of the pair is relatively stable. The coaction of the two transducers is believed to result from the interaction of the two transducer jets which causes them to synchronize the two transducer jets bending to the left and then to the right in unison. Thus, in terms of this theory, the transducer jets issuing from nozzles 19 and 20 in FIGURE 8 oscillate pendulum-wise back and forth across the leading edges of their corresponding splitters 27 and 28. Stating the same thing differently, according to this theory the transducer jets issuing from nozzles 19 and 20 bend to the left (i.e., toward side wall 22), then to the right (i.e., toward side wall 23), then to the left, etc., in unison, the transducer jet issuing from nozzle 19 being bent to the left of its associated splitter 27 when the transducer jet issuing from nozzle 20 is bent to the left of its associated splitter 28, and the transducer jet issuing from nozzle 19 being bent to the right of its associated splitter 27 when the transducer jet issuing from nozzle 20 is bent to the right of its associated splitter 28. For convenience, the jet issuing from nozzle 19 will hereinafter be called the "first transducer jet," while the jet issuing from nozzle 20 will hereinafter be called the "second transducer jet."

While the reasons for this automatic synchronization of the first and second transducer jets is not completely understood, the fact that both the "tuned chamber" and "untuned chamber" specimens of the invention exhibit this phenomenon, leads to the belief that the spacing of the transducers by one-half design wavelength is responsible. That is, each of the transducers initiates periodic, substantially sinusoidal pressure waves at its leading edge. These pressure patterns radiate cylindrically from the leading edges of the splitters. Due to the half-wavelength spacing, however, the trough (rarefaction) from the first transducer arrives at the second transducer just as the second transducer is passing outside the second splitter 28. The reduced pressure inside splitter 28 causes the second transducer jet to cross splitter 28 and pass down the inside thereof. The crest (condensation) from the second transducer causes the first transducer jet to cross its associated splitter in the outward direction at the same time that the second transducer jet is making its inward transition. Thus, it may be seen that the only stable condition of operation of said first and second jets is that of synchronization at a frequency equal to the design frequency, or nearly so. The phenomenon of interaction between a "blade of air" and the travelling wave from a resonator is well known as exhibited, for instance, in flue type organ pipes, and described at length by Helmholtz.

Because of the highly significant practical difference, viz., production of far greater power between the parallel, adjacent jet-edge transducer pairs taught herein, and the single jet-edge transducers common in the prior art, a distinction between the two arrangements will be made hereinafter, calling the former arrangement a "paired transducer oscillator" and the latter arrangement a "single transducer oscillator."

It is emphasized that the paired transducer oscillator concept is an important feature of the present invention when taken by itself without reference to the further features of the present invention shown and described herein, since the paired transducer oscillator, though a relatively low powered device, has important applications where only relatively low powers are needed, but where the even lower power and the frequency instability of the prior art single transducer oscillators makes their use difficult, or bars their use completely.

Having introduced the paired transducer oscillator concept, it will now be re-emphasized, as stated above, that the power output and frequency stability of such a paired transducer oscillator are improved by locating the paired jet oscillator in a chamber of which the walls parallel to the planes of the nozzles are spaced from their adjacent nozzles by the distance separating the nozzles, i.e., one-half wavelength at the frequency of oscillation of the oscillator. This concept of locating a paired jet oscillator in what might be called a resonant chamber is a further important feature of the present invention.

This type of paired jet oscillator will hereinafter be called a "tuned chamber-paired jet oscillator," while the type of oscillator having what may be called a non-resonant chamber will be referred to hereinafter as an "untuned chamber-paired jet oscillator." By way of example, then, the specimen of the invention shown in FIGURE 8 is a tuned chamber-paired jet oscillator, while the specimen of the invention shown in FIGURE 7 is an untuned chamber-paired jet oscillator.

The concept of the tuned chamber-paired jet oscillator is an important feature of the present invention.

Attention is now directed to jet J-18 issuing from nozzle 18, the nozzle located between, and spaced equidistant from, transducer nozzles 19 and 20, which is herein called the "driven jet" because it is driven from side to side by transducer jets J-19 and J-20 issuing from nozzles 19 and 20, respectively. Referring to FIGURE 8, it will be seen that the three principal types of jets which form the basis of the present theory of operation are shown therein by streams, or trails, of arrows. Particularly, the first and second transducer jets, J-19 and J-20, respectively, are shown by light-weight arrows, driven jet J-18 is shown by medium-weight arrows, and power jet J-17, which will be treated of hereinafter, is shown by heavy-weight arrows.

Considering the oscillator section of FIGURE 8, it may be seen that transducer jets J-19 and J-20 issuing from nozzles 19 and 20 are at the leftward extreme of their pendulum-like, synchronous oscillation. The jet of the first transducer is at this time directed downward through passage 29 and will not be further discussed at this time. The jet of the second transducer, on the other hand, is directed between splitters 27 and 28, i.e., down junction passage 35, 36, near the inner edge of splitter 28, at this time.

Since jet J-20 is directed down passage 35, 36 and jet J-19 is not, it follows according to a principal aspect of the present theory of operation, that the driven jet J-18 issuing from nozzle 18 will be deflected rightwardly as in FIGURE 8, i.e., toward the second transducer jet J-20, as seen in FIGURE 8. This deflection of driven jet J-18 toward transducer jet J-20 is believed to take place because of what is sometimes known as the Coalinga effect, that is, because a rarefaction is caused in the space between two adjacent parallel jets due to a portion of the adjacent medium becoming entrained in the jets and, thus, the jets are drawn toward each other.

Because of this deflection, driven jet J-18 is directed into control passage 36 at the time shown in FIGURE 8. The further function of the driven jet, and the function of control passage 36 will be discussed hereinafter.

As described hereinabove, the transducer jets will continue their synchronous, pendulum-like oscillation by deflecting to the rightward in unison until transducer jet J-19 is directed down passage 35, 36, closely adjacent splitter 27, and transducer jet J-20 is directed downward through spoiler, or anti-Coanda passage 30. At this time, i.e., when the transducer jets have reached their opposite extreme of oscillation from that shown in FIGURE 8, or, put differently, the oscillation of the transducer jets has accomplished one-half of its cycle of oscillation, driven jet J-18 will be deflected leftwardly by the Coalinga effect between itself and transducer jet J-19, passing downward through control passage 35.

When transducer jets J-19 and J-20 have returned to the leftward extreme position shown in FIGURE 8, driven jet J-18 will then be again deflected downward through control passage 36, as shown in FIGURE 8.

Summarizing, it is a principal aspect of the present theory of operation that driven jet J-18 will be deflected from side to side of splitter 32 in synchronism with, but in phase opposition to, the pendulum-like oscillations of transducer jets J-19 and J-20. That is, driven jet J-18 will be deflected rightwardly when transducer jets J-19 and J-20 are directed leftwardly, and driven jet J-18 will be deflected leftwardly when transducer jets J-19 and J-20 are directed rightwardly, driven jet J-18 always being deflected toward the transducer jet J-19 or J-20 which is passing down passage 35, 36. Since, as described hereinabove, the paired jet oscillator formed by transducers 19, 27 and 20, 28 oscillates continuously, its jets J-19 and J-20 bending to the left and right in unison, the driven jet J-18 will also oscillate, bending to right and left as the transducer jets bend to left and right.

Going into driven jet theory in more detail, it is believed that the transducer jet flowing down the inside of its corresponding splitter, i.e., down passage 35, 36, is effectively fastened to the inside of its corresponding splitter by Coanda effect. This has the advantage that the fastening of the transducer jet to the inside surface of its splitter greatly adds to the power of the transducer jet to deflect driven jet J-18 toward it. That is, Coanda effect, and the splitter associated with the transducer jet passing down passage 35, 36, have the effect of "anchoring" that transducer jet in space. Therefore, the "anchored" transducer jet is able to exert a much stronger pull on driven jet J-18 than would be the case if the transducer jet were merely in free space, and not "anchored." Summarizing to this point, when one of the transducer jets passes down the inside of its splitter it is "anchored" to the inside wall of its splitter by the Coanda effect. However, the driven jet J-18 is attracted to the transducer jet by the Coalinga effect as explained above. Therefore, we have the situation in which the Coanda effect affixes the transducer jet to a splitter, its associated splitter, whereupon the Coalinga effect causes the driven jet to be pulled toward the splitter, and then merged with the transducer jet, the merged jet, or resultant single jet, then being locked to the inner wall of the splitter by the Coanda effect.

The above showing that there is a very desirable combination of Coanda and Coalinga effects involved in the oscillatory operation of the device of the invention is an important characteristic feature of the invention.

The second effect may first be briefly summarized as follows. When a transducer jet, say J-19, retreats past its splitter, due to the well-known jet-edge transducer operation, it is believed that there is a sufficiently large space left between the driven jet J-18 and the inner wall of that same splitter, so that there is no Coanda effect lock, i.e., locking the driven jet to that same splitter. Of course, it is recognized that, were the driven jet merely static, a Coanda effect lock could soon result. However, according to the design of the oscillator of the invention, the simultaneous reappearance of the opposite transducer jet J-20, i.e., simultaneous with the retreat of the transducer jet J-19 we were just talking about, provides a Coalinga effect adjacent the opposite splitter sufficiently great to overcome any such possibility of Coanda effect lock at the splitter we were just talking about.

More specifically, assuming that transducer jet J-19 is now passing down the inside of its associated splitter 27, and that driven jet J-18 is merged therewith, we will now consider, in terms of combined Coanda-Coalinga effect, what happens during the "transfer" of driven jet J-18 from control passage 35 to control passage 36. As the present theory would have it:

(1) Jet J-19 "disappears" i.e., oscillates to its direction pointing down spoiler passage 29, (2) in so doing, jet J-19 presents a decreasing velocity stream, therefore diminishing Coanda effect as well as a diminishing Coalinga effect, (3) simultaneously with the "disappearance" of jet J-19, however, the "reappearance" of jet J-20 takes place, and the Coanda and Coalinga effects of J-19 and J-20 are equal and opposite, momentarily relaxing the lateral forces on J-18, (4) thus, at substantially the same time that there is any tendency for jet J-18 to be attracted by Coanda effect to the right-hand wall of splitter 27, a sufficiently strong Coalinga effect is exerted by the now returned jet J-20 to overcome any such tendency toward Coanda effect lock. And, thus, (5) the transfer of driven jet J-18 from passage 35 to passage 36 takes place successfully, without Coanda effect lock of J-18.

Going now to the amplifier section of FIGURE 8, as defined hereinabove, it will be seen that the lower ends of control passages 35 and 36 are curved to such an extent that the driven jet J-18 stream issuing from the lower end of control passage 36 (medium weight arrows) intersects the power jet J-17 (heavy arrows) issuing from nozzle 17 at an angle of the order of 45 to 90°. Due to this angle of intersection of the lower end of control passages 35 and 36 with the axis of nozzle 17, it is believed, according to the present theory of operation, that the driven jet is able to deflect the power jet J-17 issuing from nozzle 17 through a small angle. Thus, as shown in FIGURE 8, the driven jet issuing from nozzle 18, when it passes downwardly through right-hand control passage 36, deflects the power jet (heavy arrows) leftwardly.

Similarly, when the driven jet J-18 is deflected leftwardly down control passage 35 it will deflect the power jet J-17 rightwardly. It is believed that the ability of the driven jet to deflect the power jet is attributable to the now well-known proportional amplification effect, and need not be discussed further here.

Summarizing, it is believed, according to the present theory of operation, that the driven jet issuing first from the lower end of control passage 35, and then from the lower end of control passage 36, as it is deflected first rightwardly and then leftwardly as explained above, causes power jet J-17 to be deflected in synchronism with the driven jet, but in phase opposition thereto. In other words, the driven jet, directed alternately through control passages 35 and 36, intersects with the power jet J-17 at nozzle 17, causing the power jet to bend from side to side in synchronism with, and in phase with, the transducer jets J-19 and J-20.

Due to the fact that power jet J-17 is deflected in synchronism with the deflection of transducer jets J-19 and J-20, it is believed, according to the present theory of operation, that the transducer jet J-0 which is not directed between the splitters 27 and 28 passes between the power jet J-17 and the throat wall, 40 or 41, toward which the power jet is deflected, said jet J-0 being conveyed from its transducer nozzle to the region between the power jet and the wall toward which it is deflected by means of its corresponding spoiler passage, or anti-Coanda passage, 29, 30. Thus, as shown by the trails or streams of arrows in FIGURE 8, it is believed, according to the present theory of operation, that when transducer jet J-19 is directed outside of its corresponding splitter, it passes downward through spoiler passage 29, interposing itself between the power jet (heavy arrows) and the wall 40 toward which the power jet is directed.

Similarly, it is believed that when power jet J-17 is directed rightwardly jet J-20 will issue from the right hand spoiler passage 30 and interpose itself between the power jet and wall 41, said jet J-20 being directed downward through spoiler passage 30, as explained hereinabove.

The highly beneficial function which these streams interposed between the power jet and the wall toward which it is directed are believed to accomplish in accordance with the present theory of operation is the "spoiling," or "nullifying," of the Coanda effect locking of the power jet J-17 (heavy arrows) to the wall 40, or 41, toward which it is directed. That is, fluidic theory would predict that the power jet, when deflected toward, say, wall 40, would adhere to that wall, thus preventing further alternate bendings of the power jet, and nullifying the effect of the driven jet passing alternately through control passages 35 and 36, as described hereinabove. It is observed that in practice of the present invention, however, that no such Coanda effect locking takes place. This absence of difficulties with the Coanda effect is believed to be due, according to the present theory of operation, to the "spoiling," or "nullifying," of the Coanda effect by the spoiler jets issuing from spoiler passages 29 and 30.

This "spoiling," or "nullifying," of the Coanda effect is believed to take place as follows. According to the theory of the Coanda effect, a stream such as the power jet stream herein locks to one wall of a passage through which it is directed after being impelled toward said one wall, and away from the other wall of a passage, because a rarefaction is created between said stream and said one wall by the entrainment of particles of a medium confined therebetween in the stream. This rarefaction, relative to the body of medium existing on the other side of the stream, causes the stream to be deflected even closer to said one wall, the rarefying effect of the stream becoming more efficient because of the smaller volume remaining between said one wall and the stream, etc. Thus, a cumulative effect takes place whereby the stream is more and more rapidly impelled toward said one wall, and is locked thereupon, since any tendency of the stream to depart from said one wall will necessarily be accompanied by a very considerable rarefaction between said stream and said one wall, forcibly returning said stream to said one wall.

According to the present theory of operation of the present invention, however, such Coanda effect locking of stream to wall can be "spoiled," or nullified, by introducing a second stream between said one wall and the abovesaid stream, thereby supplying the fluid lost by entrainment in the first mentioned stream to the space between the first mentioned stream and said one wall, and preventing the initiation of that rarefaction in the space between the first mentioned stream and said one wall which, as described above, brings about Coanda effect locking to said one wall.

That is, according to the present theory of operation, the streams supplied through the spoiler passages 29 and 30 to the space between the power jet and the wall toward which it is directly supply at least sufficient fluid to said space to prevent the formation in said space of the rarefaction or vacuum, necessary to create a Coanda effect lock between the power jet stream and the wall, 40 or 41, toward which the power jet stream is deflected.

It is further believed, according to the present theory of operation of the present invention, that the spoiler streams conveyed through spoiler passages 29 and 30 provide sufficient fluid to prevent Coanda effect locking of the power jet to either of side walls 40 or 41 throughout the entire length of side walls 40 and 41 extending through, and out, ports 44 and 45 (FIGURE 3).

*Theory of operation—Radiator section FIGURE 3*

As shown in FIGURE 3, the power jet J–17, when deflected leftwardly by the driven jet J–18 from right-hand control passage 36, is believed, according to the present theory of operation, to pass to the left of divider 42 and out port 44. Similarly, when the power jet J–17 is deflected rightwardly by the driven jet J–18 passing downwardly through control passage 35, it is believed that the power jet J–17 passes to the right of the divider 42, and out through port 45. Thus, since the power jet (heavy arrows) is bent first left and then right as described hereinabove, i.e., is caused to issue first from port 44, then from port 45, then from port 44, etc., it is believed that each port is in effect a source of supersonic frequency pressure pulsations, the pulsations occurring at port 44 being 180° out of phase with respect to the pulsations occurring at port 45. The series of pulsations occurring at either port, taken alone, would, of course, result in a train of travelling waves of rarefaction and compression radiating therefrom into empty space. Due to the phase relationship of the travelling waves radiating from the two ports, however, it is believed, according to the present theory of operation, that a two-lobed pattern of extremely powerful standing waves is produced in the empty space adjacent the end of the device of the invention containing the ports. The wave pattern produced in a confined well bore will of course not be practically predictable.

While it is believed that certain tests made with devices embodying the present invention, as described hereinbelow in connection with FIGURE 9, have strongly confirmed the existence of a pattern of powerful standing waves even in a well bore, it is to be understood that the present invention is in no way limited by the present theory of operation.

*Application of first embodiment*

FIGURE 9 illustrates a use to which the first embodiment of the present invention illustrated herein (FIGURES 1, 2, 3, 4, 5, 6, and 8) may be put. As seen in FIGURE 9, a device 50 so constructed in accordance with the first embodiment of the present invention illustrated herein is suspended on the lower end of the lowest section 51 of a string of drill pipe, the nipple 11 (FIGURE 4) of the device being interthreaded with the threads inside the lower end of section 51 of drill pipe. Said string of drill pipe serves not only to suspend device 50, but to supply the compressed air operating medium to device 50 through nipple 11. Device 50 is suspended by means of said string of drill pipe within a string of well-casing 52, it being a feature of this method of application of the present invention that a completely cased well may be drilled thereby, the sonic energy radiation pattern emitted from the ports in the lower end of the device being of sufficient extent and intensity as to dislodge material at a sufficiently large radius to form a bore 53 larger in diameter than casing 52. Thus, casing 52 may be inserted in bore 53, section by section, as sections of drill pipe are added to said string, the lower section 52 of casing dropping into bore 53 as it is extended by the action of device 50. The casing will continue to drop into bore 53 as it is extended, the high intensity vibrations induced in the casing as a byproduct of the operation of device 50 aiding in impelling the casing downward in bore 53 even when a small portion of the bore between the lower end of lower section 52 of the casing and the surface of the ground has caved and is therefore gripping the casing. The lower end of casing section 52 is shown in FIGURE 9 as spaced from the bottom of bore 53, it being assumed merely for purposes of illustration that the casing at that time is gripped by a cave further up bore 53, and that the byproduct vibrations imparted to the casing by the action of device 50 have not as yet fully settled the casing in bore 53. As shown in FIGURE 9, the sonic standing wave pattern emitted by the ports in the lower end of device 50 are assumed to exist in cavity 54, and to be removing material from the bottom of bore 53 by vibrating particles thereof at amplitudes and frequencies which impart energy in excess of the cohesive forces thereof. Device 50 may, of course, be centered within the lower section 52 of the casing, but centering means capable of centering device 50 within casing 52 are old and well-known in the art, and are not shown or described herein. While lower casing section 52 is shown in FIGURE 9 as being spaced from the bottom of bore 53 and device 50 is shown as being located within lower casing section 52, it is to be understood that the relationship of casing section 52, device 50, and bore 53 shown in FIGURE 9 is not intended to represent an optimum interrelationship of these elements, or one in any sense limiting the present invention.

*A second embodiment of the present invention (FIGURES 10 and 11)*

FIGURES 10 and 11 show the throat section of a second embodiment of the present invention, the oscillator and amplifier sections, etc., of this embodiment being identical with those of the first embodiment. That is to say, the device of the second embodiment differs from the device of the first embodiment only in the throat section, and, for this reason, only the throat section is shown in FIGURES 10 and 11. The throat section shown in FIGURES 10 and 11 comprises the lower end of semi-bodies 55 and 56 (FIGURE 11) said semi-bodies being joined by suitable bolts which are of the same structure and function in the same way as the bolts 7 of the first embodiment. Since, as may be seen in FIGURE 10, the sonic energy supplied by the oscillator and amplifier sections of the device of the second embodiment is directed outwardly to two regions, one on either side of the device, means are provided for confining this energy to those regions. The means for so confining the energy directed outwardly from the device consists of a series of three tuned chokes 57, 58, and 59 located above the radiator ports described hereinbelow, and three additional tuned chokes 60, 61, and 62 located below said radiator ports. Each of said chokes is a groove encircling the radiator section. Each of said grooves is equal in width and depth to one-half wavelength in the operating medium, e.g., air, mud, corresponding to the empirically determined principle of harmonic frequency of the device. The throat chamber 63 of the device of this embodiment may be thought of as an extension of the throat chamber 39 of the amplifier section of the first embodiment, the oscillator-amplifier sections of the device of FIGURES 10 and 11 being identical to the oscillator and amplifier sections of the first embodiment, as pointed out hereinabove. The divider 64 of the second embodiment has a prow 65, which corresponds to the prow of the divider of the first embodiment, but differs from the divider of the first embodiment in that it broadens to become a massive structure extending the full width of the radiator section and directing sonic energy from throat 63 outwardly through radiator ports 66 and 67. As may be seen in FIGURE 10, the cavities extending from throat 63 to ports 66 and 67, respectively, have upper walls 68 and 70 formed as continuations of the outer walls of throat 63, and lower walls 69 and 71, which are the outer edges of divider 64. As pointed out hereinabove, these cavities in semi-body 55 will be mated with corresponding cavities in semi-bodies 56 when said semi-bodies are bolted together as shown in FIGURE 11, the chambers formed by these mating cavities then being designated by the same numerals as the cavities. As also shown in FIGURE 11, the second embodiment will be equipped with wrench flats 72, 72' at locations generally in quadrature with ports 66 and 67. Side walls 73 and 74 of the throat chamber 63 defined by the joined semi-bodies 55 and 56 may be thought of as continuations of the walls 40 and 41 of the device of the first embodiment, since the second embodiment is identical with the first embodiment in its oscillator and amplifier sections.

Thus, it may be seen from FIGURES 10 and 11 that the second embodiment constitutes a device adapted to apply the sonic energy generated by a generator according to the present invention to such uses as agitating well-casing to cause it to settle when gripped by a caved section of bore, or cleaning up the producing zone of a well.

*A third embodiment—FIGURES 12, 13 and 14*

Referring to FIGURES 12, 13, and 14 there is illustrated a third embodiment of the present invention, said third embodiment having no amplifier section. The third embodiment is a hand-held, relatively low powered device intended for such uses as, for example, ultrasonic cleaning. The device of this embodiment comprises two semi-bodies 75 and 75' joined by suitable fastening means such as bolts. A pressure hose 76 by which operating fluid, e.g., water, can be supplied to an internal passage 77 of the device of this embodiment is secured in one end of the joined semi-bodies 75 and 75'. An opening 78 in one wall of pasage 77 communicates with a supply chamber 79, and also serves as a seat for a supply valve controlled by hand operated control means 80. Control means 80 is biased by compression spring 81 to so rock about pivot 82 that valve 83 may be normally urged into contact with seat 78 by spring 84. As will be apparent from FIGURE 12, valve 83 will remain in contact with seat 78, thus blocking communication between supply passage 77 and supply chamber 79 until the device of FIGURE 12 is squeezed by hand, thus depressing control 80 against the bias of compression spring 81 and raising valve 83 from seat 78, whereupon operating fluid under pressure will be supplied to supply chamber 79 from supply passage 77. Supply chamber 79 is provided with three nozzles 85, 86, and 87 extending from supply chamber 79 to oscillator chamber 88. Oscillator chamber 88 has side walls 89 and 90 which may be spaced from outer nozzles 86 and 87, respectively, by a distance equal to a multiple of one-half wave length of the operating medium corresponding to the design frequency of the oscillator, for reasons set out at length hereinabove. Wall 91 between supply chamber 79 and oscillator chamber 88 may be of a thickness equal to one-quarter design wavelength, as explained at length hereinabove. Splitters 92 and 93 are provided, said splitters having leading edges projecting into oscillator chamber 88. Leading edges 94 and 95 are properly juxtaposed to, and spaced from, nozzles 86 and 87, respectively, to form jet-edge generators therewith as explained hereinabove. Passages 96 and 97 extending past the outer edges of splitters 92 and 93 are analogous to the anti-Coanda, or spoiler, passages of the first and second embodiments, although there is no amplifier stage in the third embodiment. Divider 98 having leading edge 99, defines the adjacent walls of radiator ports 100 and 101, and, with splitters 92 and 93, defines oscillator output passages 102 and 103 extending from the center of oscillator chamber 88 to radiator ports 100 and 101. The theory of operation by which the device of the third embodiment is believed to operate is completely analogous to the theory of operation of the first embodiment set out at length hereinabove, and will not be repeated.

FIGURE 15 shows a modification of the third embodiment whereby a single output jet of sonic energy is produced, e.g., by contrast with the two out-of-phase jets of sonic energy issuing through output ports 100 and 101 of the third embodiment. FIGURE 15 shows a part of one of the semi-bodies 104 making up such an embodiment. This embodiment includes a supply chamber 105, nozzles 106, 107, and 108, oscillator chamber 109, splitter 110 and 111, and divider 112, all similar in structure and functioning in substantially the same manner as the corresponding parts similarly named in the third embodiment. The modification of FIGURE 15 differs from the third embodiment, however, in that its oscillator output passages are joined within the semi-body, and also within the mating semi-body, whereafter they communicate with radiator port 115 as a single passage. The length of passage 113 must be so proportioned to the length of 114 as to insure the correct phase relation between the sonic waves propagated down these passages at their junction. The configuration and length of passages 113 and 114 may be determined empirically.

As will be understood by comparison of the first and third embodiments herein, the device of the invention may operate by the use of (1) gas into gas, (2) liquid into gas, or (3) gas into liquid. An example of class (1) is the first embodiment described herein, while class (2) is exemplified in the third embodiment. The difference between these classes in theory of operation lies in the mechanism of energy transfer between media. Thus, in class (2) the individual water streams are found to be serving as small sonic "pipes" whose boundary is the gas-liquid interface. Even individual droplets which break off from such a stream are "ringing," and impart ultrasound on impact with a solid. In a device of class (3), however, it appears that the high energy impulses of gas mechanically drive, i.e., periodically displace, sizable volumes of liquid in the form of short lived large gas bubbles, imparting high particle accelerations and velocities to the liquid masses, alternately and in close proximity to one another.

It is to be particularly noted that the power output of the generator of the invention is without real upper limit, except for the compressor capacity used to supply it. Unlike electrical generators, in which electrical and other losses are manifested as heat, the device of the invention manifests a temperature drop in operation due to the cooling effect of the flowing gas or liquid medium providing power thereto. Also, unlike, say, piezoelectric ultrasound generators, the device of the invention has no parts which suffer the severe vibrational excitations which, in piezoelectric devices, demand that certain parts be able to withstand even greater destructive forces than are imparted to the receiving medium. In the invention the solid members provide only boundary restraint and direction to a vibrating fluid stream. Not least important, the generator may be matched with the compressor for greatest efficiency by the simple expedient of selecting the correct size of power orifice and nozzles.

Many modifications may be made in the above described embodiments without departing from the scope of the present invention. For example, a sonic generator combination may be made in which one jet-edge transducer coacts with one driven jet, the transducer and driven jet being located in a common resonator.

It will thus be seen that the objects set forth above, among those made apparent from the preceding description, are efficiently attained. Since certain changes may be made in the construction set forth without departing the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:
1. A generator for producing sonic waves in a fluid medium, comprising: a plurality of nozzles supplied with operating fluid under pressure and a pair of splitters each presenting an edge to one of said nozzles and defining therewith a jet-edge transducer, said transducers being substantially parallel and spaced apart by a distance which is a function of the wavelength in the operating fluid corresponding to the design frequency of the generator.

2. A generator as claimed in claim 1 in which the tapered ends of said splitters terminating in said edges are rigidly supported in the body of the generator and thus are not free to vibrate.

3. A generator as claimed in claim 1 in which a third nozzle is located between and equidistant from the nozzles of said transducers.

4. A generator as claimed in claim 3 in which the tapered ends of said splitters treminating in said edges are rigidly supported in the body of the generator and are not free to vibrate.

5. A generator as claimed in claim 1 in which said transducers are located in a resonator chamber having substantially parallel side walls, each of said side walls being spaced from the plane of symmetry of the nearest transducer by a distance which is a function of the wavelength in the operating fluid corresponding to the design frequency of the generator.

6. A generator as claimed in claim 5 in which a third nozzle is located between and equidistant from the nozzles of said transducers.

7. A generator as claimed in claim 6 in which the tapered ends of said splitters terminating in said edges are rigidly supported in the body of the generator and thus are not free to vibrate.

8. A generator as claimed in claim 1 in which a resonator is coupled with said transducers.

9. A generator as claimed in claim 1 in which at least the nozzle-to-edge paths of said transducers are located in a chamber having at least part of its walls treated to inhibit sound wave reflection therefrom.

10. A generator for producing sonic waves in a fluid medium, comprising: a plurality of nozzles supplied with operating fluid under pressure, and a pair of splitters each presenting an edge to one of said nozzles and defining therewith a jet-edge transducer, said transducers being substantially parallel and spaced apart by a distance B determined by the formula $$B = \sqrt{\frac{\lambda^2}{4} + a\lambda}$$

where $\lambda$ is the design wavelength of the generator and $a$ is an empirically determined constant.

11. A generator for producing sonic waves in a fluid medium, comprising: a pluraliy of nozzles supplied with operating fluid under pressure, and a pair of splitters each presenting an edge to one of said nozzles and defining therewith a jet-edge transducer, a third one of said nozzles providing a third jet passing between said transducers, said third jet being alternately locked to one and then to the other of the jets of said transducers by Coalinga effect, said jets of said transducers being locked to their associated splitters by the Coanda effect.

References Cited
UNITED STATES PATENTS

| | | | |
|---|---|---|---|
| 2,777,251 | 1/1957 | Bailey | 116—65 XR |
| 3,169,507 | 2/1965 | Rich | 116—137 |
| 3,169,509 | 2/1965 | Rich | 116—137 |
| 3,176,964 | 4/1965 | Cottell et al. | 259—1 |
| 3,187,763 | 6/1965 | Adams | 137—81.5 |
| 3,209,774 | 10/1965 | Manion | 137—81.5 |
| 3,276,419 | 10/1966 | Rich | 116—137 |

OTHER REFERENCES

Bulletin, October 1963, vol. 6, No. 5, I.B.M. Technical Disclosure.

LOUIS J. CAPOZI, *Primary Examiner.*

U.S. Cl. X.R.

137—81.5